METHOD AND APPARATUS FOR PREDICTING THE LIFETIME OF SEMICONDUCTOR DEVICES BY EXAMINING PARAMETER VARIATIONS WITH RESPECT TO TIME

Filed Nov. 3, 1960

Michael O'Hagan,
Donald A. Perry,
Albert William Wortham,
Inventors.
Koenig and Pope,
Attorneys April 12, 1966 M. O'HAGAN ETAL 3,246,242

METHOD AND APPARATUS FOR PREDICTING THE LIFETIME OF SEMICONDUCTOR DEVICES BY EXAMINING PARAMETER VARIATIONS WITH RESPECT TO TIME

Filed Nov. 3, 1960 10 Sheets-Sheet 4

April 12, 1966 M. O'HAGAN ETAL 3,246,242

METHOD AND APPARATUS FOR PREDICTING THE LIFETIME OF SEMICONDUCTOR DEVICES BY EXAMINING PARAMETER VARIATIONS WITH RESPECT TO TIME

Filed Nov. 3, 1960 10 Sheets-Sheet 5

April 12, 1966 M. O'HAGAN ETAL 3,246,242

METHOD AND APPARATUS FOR PREDICTING THE LIFETIME OF SEMICONDUCTOR DEVICES BY EXAMINING PARAMETER VARIATIONS WITH RESPECT TO TIME

Filed Nov. 3, 1960 10 Sheets-Sheet 6

April 12, 1966 M. O'HAGAN ETAL 3,246,242

METHOD AND APPARATUS FOR PREDICTING THE LIFETIME OF SEMICONDUCTOR DEVICES BY EXAMINING PARAMETER VARIATIONS WITH RESPECT TO TIME

Filed Nov. 3, 1960 10 Sheets-Sheet 9

| $X_{max.}-X_o \approx X_{max.}$ / T | 1μa | 2μa | 3μa | 5μa | 10μa |
|---|---|---|---|---|---|
| 1,000 hrs. | 12. | 6. | 4. | 2.4 | 1.2 |
| 5,000 hrs. | 60. | 30. | 20. | 12. | 6. |
| 10,000 hrs. | 120. | 60. | 40. | 24. | 12. |
| 20,000 hrs. | 240. | 120. | 80. | 48. | 24. |

United States Patent Office 3,246,242

Patented Apr. 12, 1966

3,246,242

METHOD AND APPARATUS FOR PREDICTING THE LIFETIME OF SEMICONDUCTOR DEVICES BY EXAMINING PARAMETER VARIATIONS WITH RESPECT TO TIME

Michael O'Hagan, East Palo Alto, Calif., and Donald A. Perry, Richardson, and Albert William Wortham, Dallas, Tex., assignors to Texas Instruments Incorporated, Dallas, Tex., a corporation of Delaware Filed Nov. 3, 1960, Ser. No. 67,074
10 Claims. (Cl. 324—158)

This invention relates to apparatus and methods for testing semiconductor devices and more particularly to testing apparatus and methods for predicting the reliable operating life or semiconductor devices.

Among the several objects of the invention may be noted the provision of apparatus and methods for testing semiconductor devices which will determine reliably and accurately the operating life expectancy of individual semiconductor devices; the provision of such apparatus and methods which will predict the useful operating life of semiconductor devices in a brief time interval and with enhanced accuracy; the provision of apparatus and methods of the class described which greatly reduce the testing time required to measure the failure rate of semiconductor devices; the provision of automatic testing apparatus for semiconductor devices which precisely and continuously measures a certain parameter or parameters thereof which are indicative of the useful life span of the device, and will detect unusual characteristics which should lead to a shortened semiconductor operating life; and the provision of methods and apparatus for testing semiconductor devices which may be used to rapidly check the effects of various fabrication procedures on the operating characteristics of semiconductor devices over long periods of time. Other objects and features will be apparent and pointed out hereinafter.

The invention accordingly comprises the constructions and methods hereinafter described, the scope of the invention being indicated in the appended claims.

In the accompanying drawings, in which is illustrated one of various possible embodiments of the invention, FIG. 1 is a block diagram of one embodiment of a testing apparatus of the present invention;

FIGS. 2A–2E constitute a complete circuit diagram of the testing apparatus of FIG. 1 presented in composite form;

Corresponding reference characters indicate corresponding parts throughout the several views of the drawings.

Figures 1, 6:
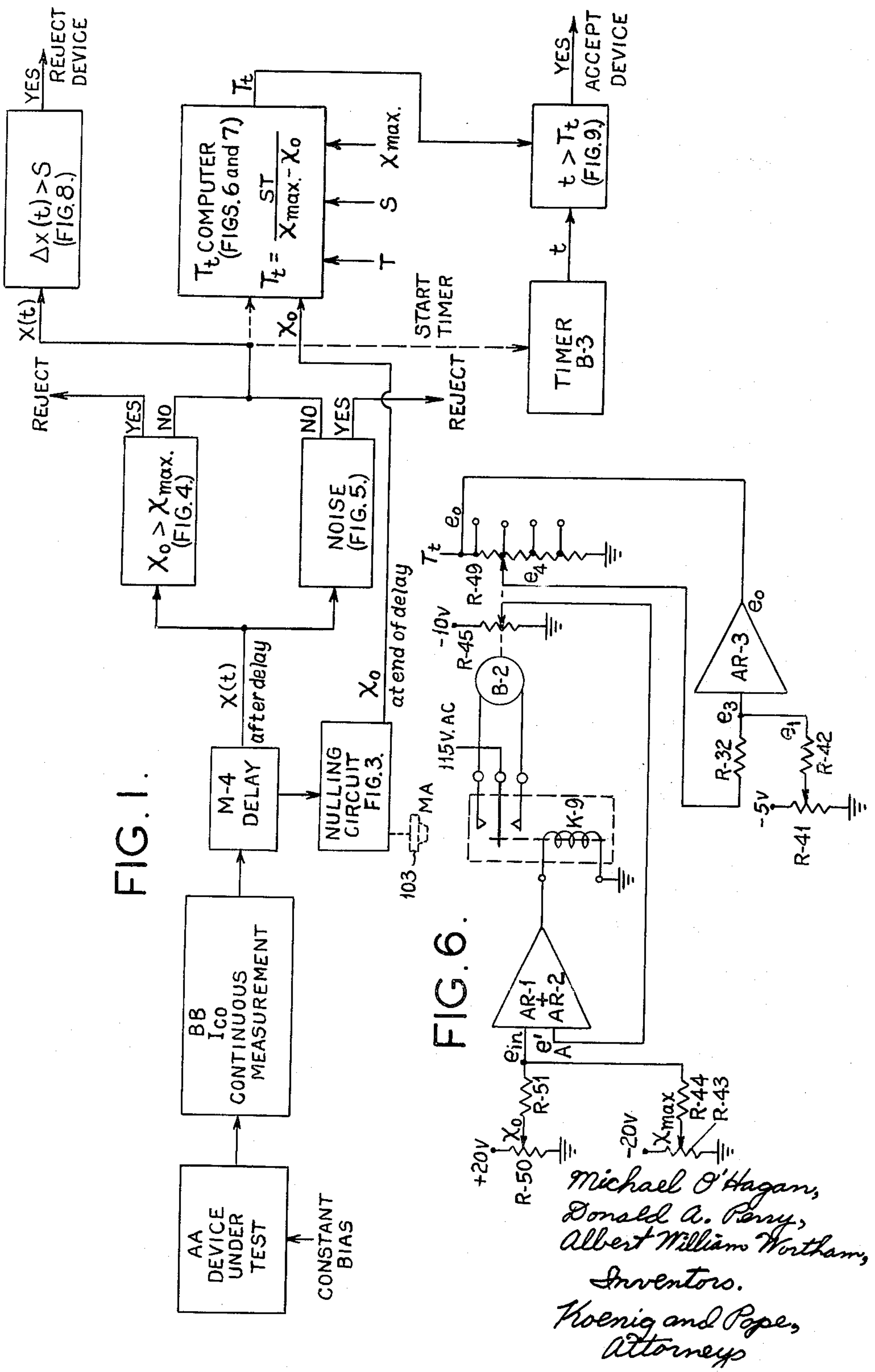
FIG. 6 is a simplified circuit diagram of the computer circuit of FIGS. 1 and 2.

Semiconductor devices have extremely high reliability since the electronic functions thereof are primarily performed within a solid, and this solid can be expected to retain its internal properties indefinitely if it is not subjected to conditions beyond its limits. Thus, semiconductor devices, even at this relatively early stage of their development, are being required to meet reliability levels far in excess of those of older types of electronic devices. Failures in semiconductor devices, such as transistors, that are presently observed over a period of time are principally caused by the sensitivity of these devices to slight imperfections, and the attendant difficulties in manufacturing a device in which submicroscopic effects play so vital a role. Many of the sudden or gradual changes observed in the electrical characteristics of transistors can be attributed to minute flaws in external construction (e.g., leads, connections, bonds, etc.) and to slight contamination of the surface of the semiconductor material which causes gradual reactions as well as other effects. These imperfections are so slight that, at present, they cannot be detected by the most precise production inspection and show up as changes in the characteristics of the transistor over a period of time. Therefore it is desirable, and in some instances necessary, not only to test semiconductor devices for initial satisfactory operating characteristics, but to test them to ascertain or predict the span of their reliable operating life.

The customary procedure is to take a sample of the production units and observe any failures over an extended period of time. The sum of the hours of operation of all units yields the operating hours, while the number of failures observed, divided by the operating hours, yields the failure rate, expressed as failures per hour. In many present and proposed applications, the failure rate for transistors for semiconductor devices approaches an extremely low value when compared with the present concepts of reliability for any other electrical or electronic device. For example, a failure rate of $10^{-8}$ for transistors would mean only one failure in $10^8$ hours of operation. That is, a sample of one unit must operate over eleven thousand years to satisfy this requirement. Alternately, according to the theory of constant rate failure, if one hundred thousand units were tested for one thousand years, and if only one failure were observed, the failure rate would be $10^{-8}$, or one failure per one hundred million operating hours. Moreover, when considering the confidence limits for failure rates, to place a 99% confidence in a $10^{-8}$ failure rate would require approximately six hundred and sixty million operating hours in which only one failure occurs. Thus, under conventional testing techniques and procedures, it is apparent that the time requirement for 99% confidence is prohibitive and it is impossible in a practical sense to verify reliability requirements calling for extremely low failure rates with high statistical confidence. Moreover, such present testing procedure is statistical and merely provides an estimation of the failure rate or expected operating life that is representative of the lot. It does not provide data on any individual semiconductor selected from the lot.

In accordance with the present invention, apparatus is provided which will reliably, accurately and rapidly (in the order of minutes) predict the operating life span of any given semiconductor device. Results are obtained on each individual semiconductor device, and tremendous savings in time and equipment and gains in accuracy compared to conventional testing apparatus and procedures are effected. Briefly, this apparatus includes a source of electrical power for connection in a first circuit with the device to be tested, and which will produce an electrical signal which is a function of a parameter of the device. The apparatus also includes a timer with an elapsed time indicator connected in a second circuit for energization at the beginning of each test period for each device, the second circuit being interconnected with the first circuit and responsive to any variation in the magnitude of the electrical signal. The second circuit includes means for deenergizing the timer upon the magnitude of the electrical signal exceeding a predetermined set of limits, so that the elapsed time indicated on the indicator is a function of the reliable operating life of the semiconductor device being tested.

Briefly, this invention also includes a method for predicting the reliable life of individual semiconductor devices that comprises continuously measuring the value of at least one electrical parameter of said device over a brief period of time, electrically comparing this parameter during the time period with a predetermined maximum acceptable value of said parameter, and measuring the actual time elapsed for said parameter to exceed said predetermined acceptable value, this actual elapsed time being a function of the reliable life of said device.

Figure 2A:
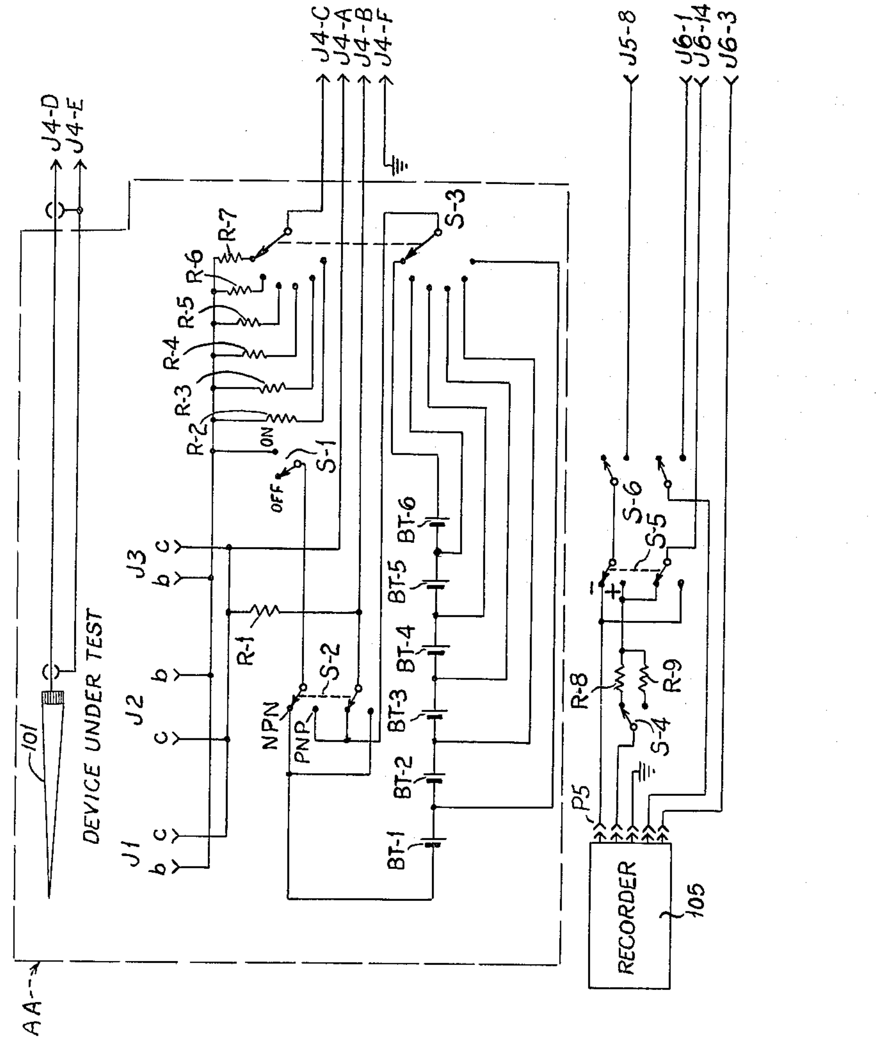
Figure 2B:
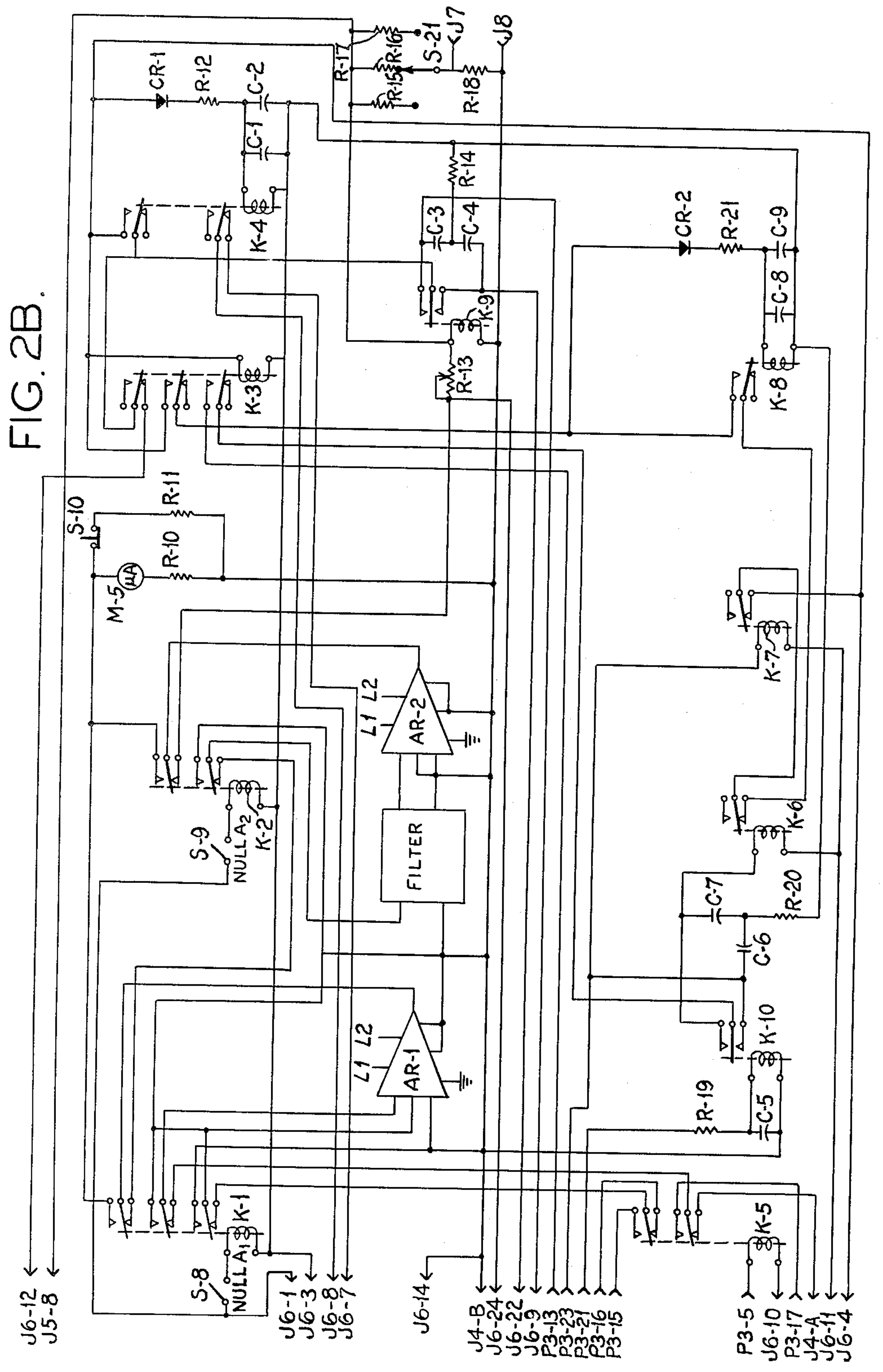
Figure 2C:
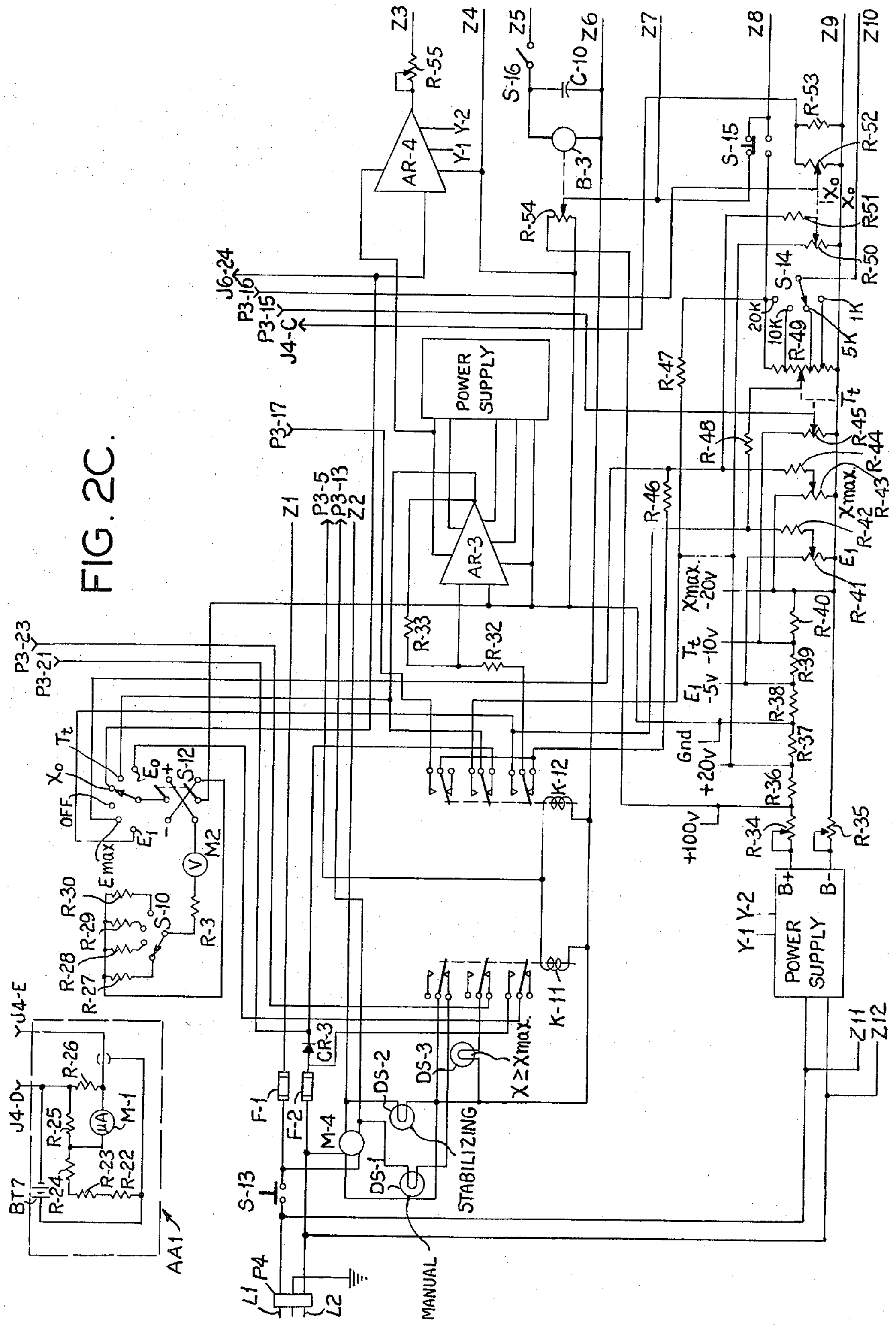
Figure 2D:
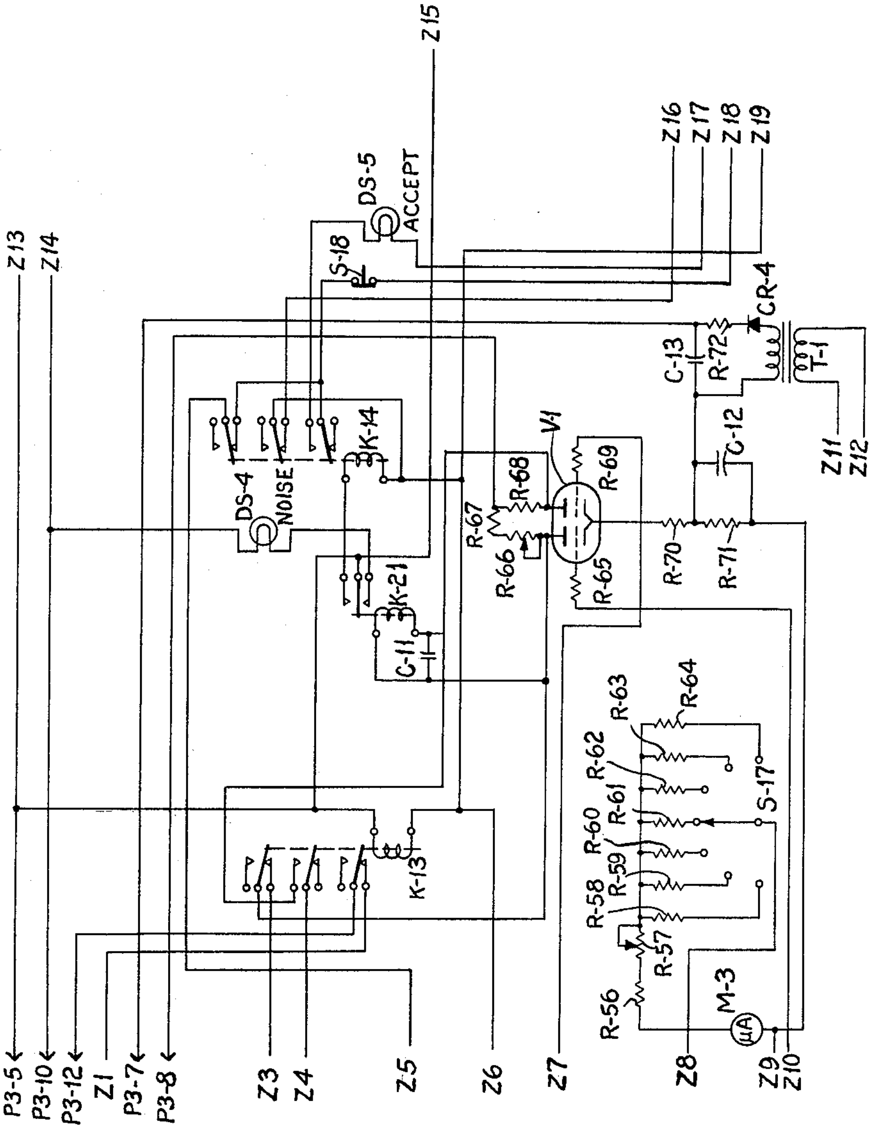
Figure 2E:
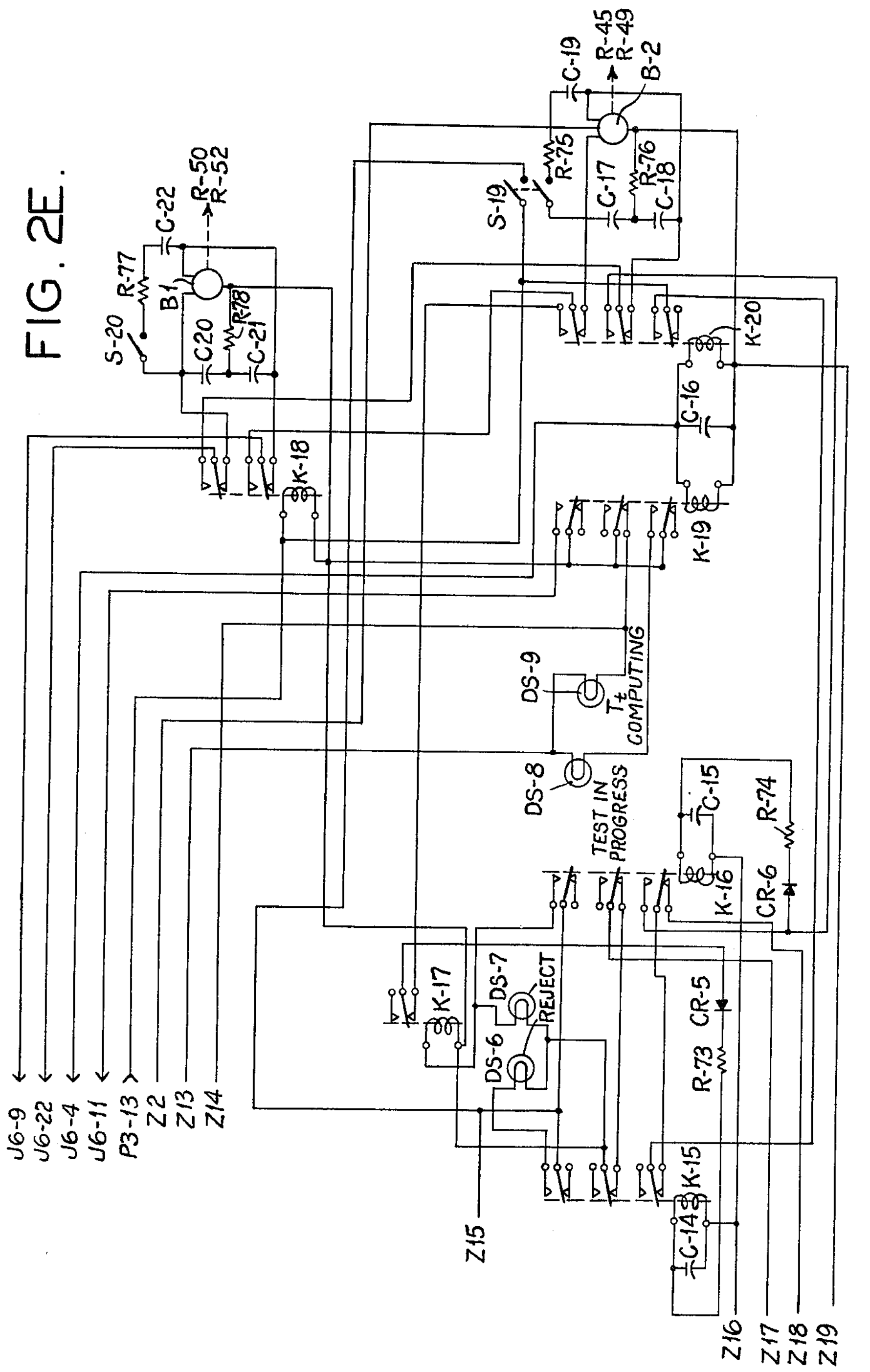

In view of the size and extent of the entire circuit diagram it could not be presented in a single sheet of drawings, so it is presented in composite form in FIGS. 2A–2E. The electrical interconnections between the composite portions of the circuit are coded according to convention so that the circuitry can be viewed in an integral form by connecting like coded conductors. To orient the composite portions of FIG. 2, FIG. 2B should be positioned to the right of FIG. 2A and FIG. 2C below FIG. 2A. FIG. 2D should be placed to the right of FIG. 2C and below FIG. 2B, while FIG. 2E should be positioned to the right of FIG. 2D. For purposes of clarification and to avoid obscuring the inventive features of the present apparatus and methods, the more significant components which cooperate in providing a particular function or associated functions are organized and are presented in separate figures, and the conventional and less essential components (or those not involved in that function) have been omitted in FIGS. 3–9. This eliminates much unnecessary and time-consuming wire tracing not needed for a full understanding of the present invention. Many of the comonents and conductors omitted from FIGS. 3–9 are utilized for relay coil energization, condition and sequence switching, interlocks, the inhibition of switching transients and many other customary circuit functions and refinements unessential to a comprehension of our invention. The complete circuitry and operation thereof will be readily apparent to those skilled in the art.

Referring now to the drawings and more particularly to FIGS. 1 and 2 (i.e., the composite assembly of FIGS. 2A–2E), a thermally insulated and electrically shielded enclosure is indicated at reference character AA. This box AA is equipped with a plurality of mounting sockets or jacks J1, J2 and J3 into which may be plugged a semiconductor device to be tested, such as a triode or tetrode transistor. Also included in unit AA are mercury cell batteries BT1–BT6 interconnected via two banks of a rotary multipole switch S3 to apply any of six preselected biasing potentials across the base-collector electrodes of the semiconductor device being tested. A single-pole single-throw switch S1 is connected across the common electrical connection of the base pin receiving contacts of jacks J1–J3 and one pole of a double-pole double-throw reversing switch S2, the operating position of which depends on whether an NPN or PNP type semiconductor device is being tested. A close tolerance resistor R1 is connected between the common electrical connection of the collector receiving pins C of J1–J3 and one terminal of batteries BT1–BT6. Resistor R1, as will be described in more detail hereinafter, carries the base-collector current and develops a potential which is a direct function of the reverse bias collector to base leakage current ($I_{CO}$) when the semiconductor device being tested is reversely biased. A thermistor probe 101 and a temperature measuring circuit AA1 (see FIG. 2C), including a microammeter M1 (calibrated in degrees temperature), a battery BT7 and a network of resistors R22–R26 in a sensitive bridge circuit, provide a continuous and precise indication of the temperature within the box AA in which the semiconductor unit under test, resistor R1, and other components are maintained at a substantially constant temperature, e.g., within the order of 0.1° C. and preferably within 0.007° C.

Figure 3:
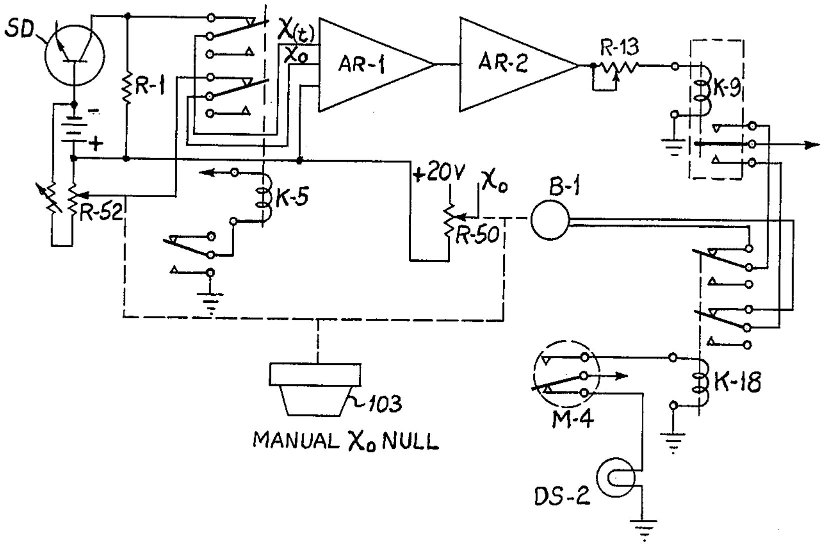
FIG. 3 is a circuit diagram of the nulling circuit portion of the FIGS. 1 and 2 testing apparatus.

Before commencing the actual testing of a semiconductor device, such as an NPN transistor as indicated at reference character SD (FIG. 3), a stabilization period is provided by a delay means as indicated at BB which includes a manually settable timer device M4 (FIGS. 2C and 3) adapted to interconnect the components in a nulling circuit as illustrated in FIG. 3, and thereby establish the value of the parameter $I_{CO}$. During this stabilization period (e.g., 5–15 minutes), the potential (proportional to $I_{CO}$) developed across R1 minus the tapped voltage at R52, constitutes an electrical error signal connected to input terminals of a D.C. amplifier AR1 (such as sold under the trade designation "Kintel model 114A") via two sets of transfer contacts of a relay K5. The output of AR1 is connected to the input of a second cascade-connected D.C. amplifier AR2 (such as sold under the trade designation "Kintel model 111BF"), the output terminal of which is connected to the coil of a micropositioner type relay K9, such as sold under the trade designation Baker Coleman 2804S. If there is any significant potential at the output terminal of AR2, the armature of K9 will be moved upwardly or downwardly (depending on the polarity of the output signal of AR2) to contact the upper or lower contact of this K9 switch and thus apply line voltage (115 v. A.C.) to one or the other of the reversing terminals of a reversible servo motor B1. The output shaft of B1 drives the rotors of two ganged potentiometers R50 and R52, the latter varying the input potential to AR1. Thus a servo action is effected by this circuit to maintain the output signal of AR2 (and therefore the input signal to AR1) at zero or a null. As the potential at the rotor of R52 is maintained opposite and equal to the potential developed across R1 (by $I_{CO}$), and its rotor is ganged to the rotor of R50, the potential at the rotor of R50 is a voltage analog of $I_{CO}$ at the end of the stabilization period. This potential is referred to and indicated as $X_0$. The contacts of timer M4 change position at the conclusion of the preset time period for stabilization, thereby deenergizing a stabilization indicator light DS2 and energizing K18 to deactuate motor B1. A manual null control knob is provided as indicated at 103 to make any final touch-up adjustment of the null voltage as indicated on meter M2 (assuming switch S12 is positioned at $X_0$ and switch S10 is set to connect the proper meter series resistor—FIG. 2C). If desired, the automatic nulling may be overridden by adjustment of the knob 103 or nulling may be done manually.

Figure 4:
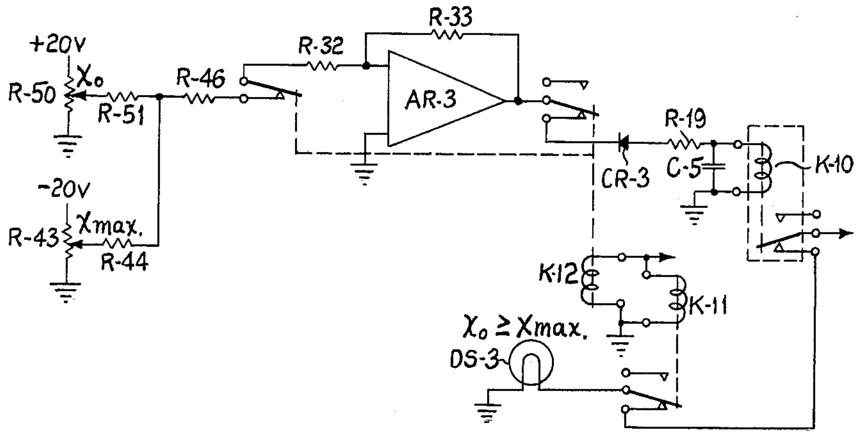
FIG. 4 is a circuit diagram of one reject circuit of the testing apparatus of FIGS. 1 and 2.

Referring now to FIG. 4, there is illustrated the circuitry utilized in this embodiment of the present invention to reject the device under test if the $X_0$ signal (i.e., voltage analog of $I_{CO}$ after stabilization) equals or exceeds a predetermined permissible maximum value for $I_{CO}$ for the type of semiconductor device being tested. This maximum $I_{CO}$ value is indicated and referred to as $X_{max}$, and is preset by adjustment of the rotor of a potentiometer R43. This rotor and the rotor of potentiometer R50 are commonly connected via isolating resistors R44, R51 and R46, and a set of contacts of relay K12 to an input terminal of another D.C. amplifier AR3. The output terminal of AR3 is connected via another set of contacts of K12, a diode rectifier CR3 and an RC circuit comprising a resistor R19 and a capacitor C5 shunt-connected across the coil of a micropositioner K10 (FIG. 2B). The contacts of K10 will be moved into the position shown in FIG. 6 if the input signal voltage of AR3 is positive or approximately 0. Assuming the contacts of K11, when the coil thereof is energized, to be in the position illustrated in FIG. 6, then 115 v. A.C. from the armature of K10 will be interconnected to an indicator light DS3 to energize it, thus indicating that the semiconductor device SD being tested has a value of $I_{CO}$ already equal to or in excess of preset tolerances.

Figure 5:
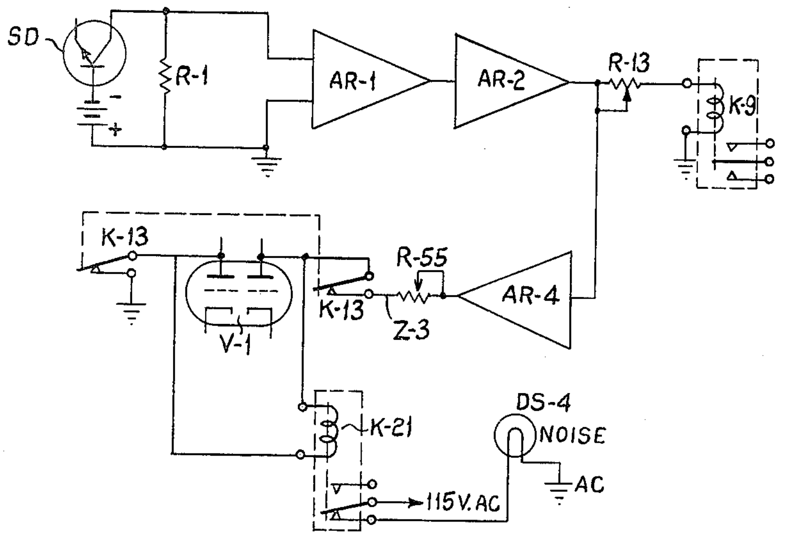
FIG. 5 is a circuit diagram of the noise reject circuit of the testing apparatus of FIGS. 1 and 2.

Another reject circuit is shown in FIG. 5. This unit functions to indicate any generation of noise beyond maximum established tolerances of the semiconductor device SD being tested. Noise is defined as an A.C. component superimposed on the D.C. potential developed across R1 by $I_{CO}$. In this noise reject circuit, any noise signal is amplified by AR1 and AR2, the output terminal of AR2 being connected to the input terminal of AR4, an A.C. amplifier which rectifies the A.C. noise signal voltage and feeds this resulting D.C. signal (having a magnitude proportional to the noise amplitude) to a micropositioner K21, via a sensitivity rheostat R55, a conductor Z3 and one set of contacts of a relay K13. This micropositioner K21 is adjusted to make contact at any desired predetermined level of A.C. noise signal and thereby energize dial light DS4 to indicate if the noise level of the device SD under test exceeds tolerance. For example, in certain types of transistor devices, any noise sufficient to develop an A.C. potential exceeding 13 microvolts R.M.S. across R1 would effect a reject indication by this circuit.

Any semiconductor device SD being tested which does not after the stabilization period actuate micropositioner K10 (and thereby light DS3 to indicate $X_0 \geqq X_{max}$) or K21 (and thereby light DS4 to indicate excessive noise) will then be tested to determine its predicted satisfactory operating life. During this actual testing period, the drift, if any, in $I_{CO}$ is precisely and continuously measured and the characteristics and rate of drift are interpreted by the computer in terms of lifetime and an accept or reject decision may be made automatically if a specific predicted lifetime is desired. Testing times range from less than a second to four hours for each semiconductor device being tested, this time period depending on the lifetime requirement, the maximum allowable parameter value ($X_{max}$) and the initial parameter value of ($X_0$) after stabilization. By continuous accurate measurement of the characteristics and rate of drift in the $I_{CO}$ parameter, it is possible to determine in short periods of time certain characteristics in the electrical output of any individual transistor, such as noise, rapid drift, various transients, and other characteristics indicative of defects, and thus detect factors or properties inherent in the individual semiconductor device being tested that can lead to failure before a specified lifetime.

In view of the fact that the drift rates of any parameter chosen as the criterion, such as $I_{CO}$, may be very small, i.e., 0.00005 microampere/hr., the apparatus of the present invention is quite sensitive. The time period, referred to and indicated as $T_t$ during which the parameter reading $X_t$ (the value of the parameter at any time $t$) must be continuously observed in order to detect whether the drift rate is great enough to cause failure on or before the required lifetime T, is given by:

$$T_t=\frac{ST}{X_{max}-X_0}$$

where: $T_t$=measurement time of computer
$S$=sensitivity of computer in $\mu$a.
$T$=required lifetime of device being measured
$X_{max}$=parameter upper limit (above which device is a failure)
$X_0$=initial value of parameter The derivation of the equation is apparent from FIG. 10.

A typical example of the use of the equation might be, given:

| | | |
|---|---|---|
| $X_{max}$=upper limit for $I_{CO}$ | $\mu$a | 3 |
| $X_0$=initial $I_{CO}$ value | $\mu$a | .01 |
| $S$=fixed computer sensitivity | $\mu$a | .0002 |
| $T$=required device lifetime | $\mu$a | 10,000 |

then, the testing time to determine whether this device will satisfy the required lifetime specification is given by:

$$T_t=\frac{(.0002)\,(10{,}000)}{3-.01}=\frac{2}{2.99}\text{ hours}\approx 40\text{ minutes.}$$

Thus, in this example, if the amount of drift in $I_{CO}$ does not exceed .0002 $\mu$a. in 40 minutes, the device is acceptable. If this amount of drift were encountered at any time within the 40 minutes, then the device would not be acceptable under the given requirements of $X_{max}$ and T.

Figures 9, 10, 11:
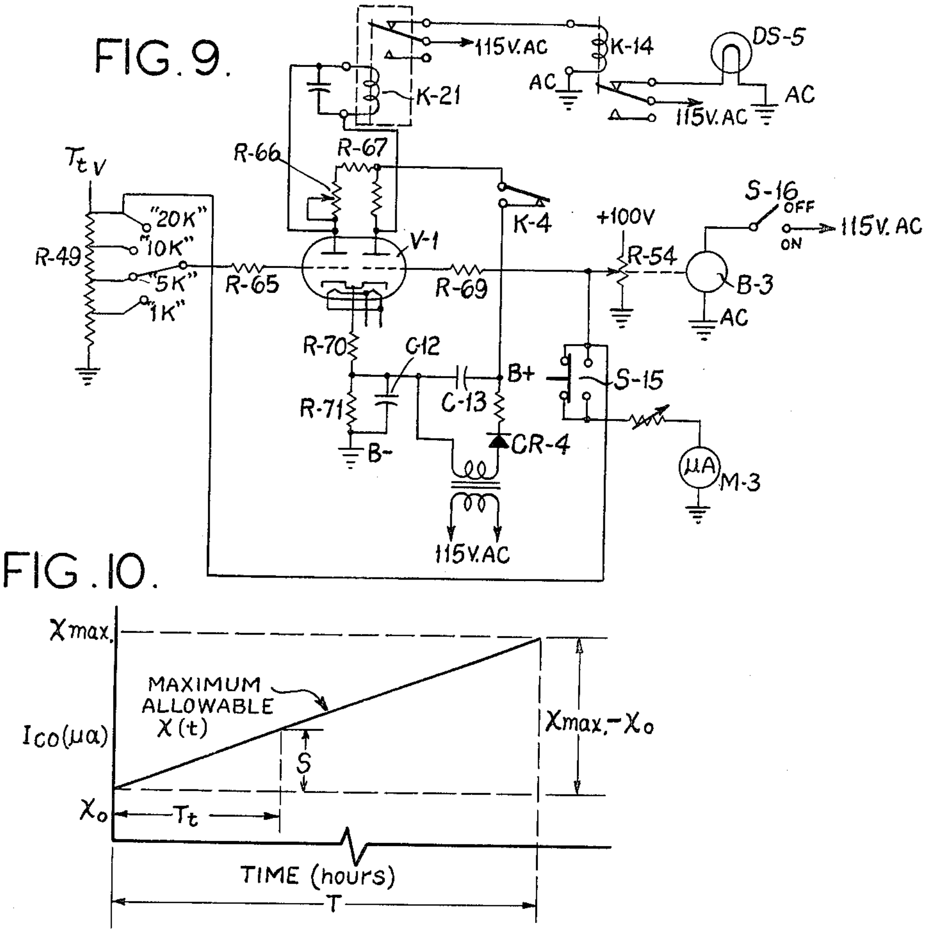
FIG. 9 is a circuit diagram of the accept circuit of FIGS. 1 and 2 testing apparatus.
FIG. 10 is a graph illustrating relationship utilized in the present invention.
FIG. 11 is a table indicating exemplary minimal testing times for various lifetime requirements.

To further illustrate the important relationship between actual testing times ($T_t$ in minutes) and the required lifetime of the particular device being tested, a table of exemplary minimal testing times is shown in FIG. 11, assuming an instrument sensitivity of .0002 microampere. All $T_t$ computation on the computer in made on the basis of 20,000 hours lifetime requirement. Results are in volts. The conversion to actual time is made by:

$$T_t\text{ volts}\times 24\ \frac{\text{min.}}{\text{volt}}=T_t\text{ minutes}$$

For conversion when require T is less than 20,000 hours, multiply the previous results by:

| | Hrs. |
|---|---|
| .05 for T | 1,000 |
| .25 for T | 5,000 |
| .50 for T | 10,000 |

Figure 7:
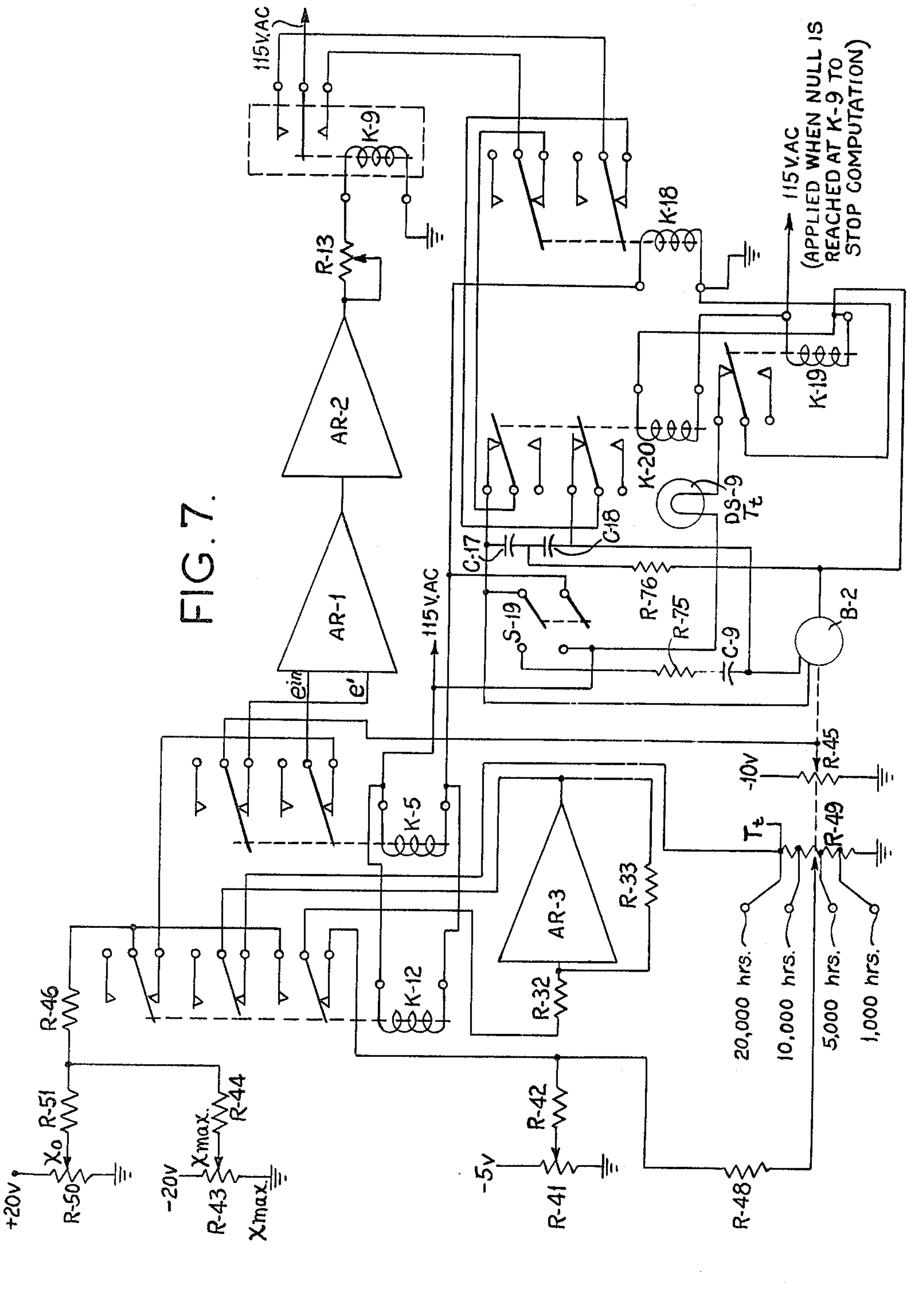
FIG. 7 is a circuit diagram of the computer circuit of FIGS. 1 and 2.

Before actual testing begins, it is necessary to provide a voltage analog of $T_t$, and this function is performed by the circuitry illustrated in a simplified from in FIG. 6, and in greater detail in FIG. 7. The circuitry for computing $T_t$ is conditioned for operation by actuation of switch S19 (cf. FIG. 2E) to a closed position, which is visually indicated by DS9 being energized. The composite of D.C. signal $X_0$, present at the rotor of potentiometer R50, and the D.C. signal $X_{max}$ (as preset by the positioning of the rotor of R43), present at the rotor of R43, i.e. $X_{max}-X_0$, is referred to as $e_{in}$ and is fed to an input terminal of AR1. The output of the cascaded amplifier AR2 is connected to the coil of micropositioner K9, adapted to move the armature thereof either upwardly or downwardly, depending on the polarity of the D.C. output signal of AR2. Two two fixed contacts of K9 are connected via transfer contacts of relays K18 and K19 (FIG. 7) to the reversing terminals of a servo motor B2. The shaft of B2 mechanically drives the motors of two ganged potentiometers R45 and R49 (tapped). The D.C. signal at the rotor of R45 is fed back to the input of AR1 (via contacts of relay K5) and this signal is indicated and referred to as $e'$. Thus the composite or algebraic sum of the $e_{in}$ and $e'$ potentials constitutes an error signal, $e_{in}-e'$, which is amplified and utilized to control the micropositioner K9 to drive servo motor B2 to minimize the difference in $e_{in}$ and $e'$. This relationship then exists:

$$e_{in}\approx(X_{max}-X_0)\therefore e_{in}=C_1(X_{max}-X_0)$$

The armature of micropositioner K9 releases or is centered when the output of AR2 is zero or null, i.e., when $e_{in}=e'=C_1(X_{max}-X_0)$. Thus the servo motor B2 stops at an angular position $\theta$ with respect to 0. The following relationship obtains:

$$\theta\approx(X_{max}-X_0)\therefore\theta=C_2(X_{max}-X_0)$$

The potential at the rotor of R49, referred to an indicated as $e_4$ is therefore equal to $\theta e_0$, inasmuch as its rotor's angular position always corresponds to that of R45 and $e_0$ is the potential applied to the potentiometer R49. This D.C. signal $e_4$ is applied via contacts of relay K12 and an isolation resistor R32 to the input terminal of D.C. amplifier AR3, the output signal of which is $e_0$. The input signal to amplifier AR3, referred to an indicated as $e_3$, has the following relationship with $e_0$, the output signal of AR3:

$$e_0=K_3e_3$$

As $e_3$ is a composite of a voltage $e_1$ present at the rotor of a potentiometer R41 and $e_4$, $e_3=e_1-e_4$. Substituting $(e_1-e_4)$ for $e_0$ in the penultimate equation yields:

$$e_0=K_3(e_1-e_4)=K_3(e_1-\theta e_0)$$

$$e_0=\frac{K_3e_1}{1+K_3\theta}\text{ Assuming }K_3\theta\gg 1$$

$$e_0=\frac{e_1}{\theta}=\frac{e_1}{C_2(X_{max}-X_0)}$$

By setting $e_1=1$ volt by the proper positioning of the rotor of R41, the product ST in the $T_t$ computation=1. Therefore, assuming $T=20{,}000$ hrs. and $S=.0002$ $\mu a.$, then $$e_0=\frac{1}{C_2}\,\frac{ST}{X_{max}-X_0}$$

$C_2=24\ \frac{\text{minutes}}{\text{volt}}$ (This value is determined by a timer B3 in the accept circuit of Fig. 9)

$$C_2e_0=T_t\text{ min.}=\frac{ST}{X_{max}-X_0}$$

This is the required computation for T equal to 20,000 hrs. Thus, the signal voltage $e_0$ (times its constant $C_2$) is a voltage analog to $T_t$ and proportional voltages representative of lesser lifetime periods T may be scaled off R49 (for purposes described hereinafter), such as 10,000 hrs., 5,000 hrs., and 1,000 hrs., by positioning the rotor of a switch S14 (FIG. 2C) to the proper contact. It will be noted that the resistance portion of R49 between its top stator contact and its rotor is part of the feedback circuit of amplifier AR3 and the gain thereof is therefore a function of the positioning of the rotor of R49. It will be understood that the value of $T_t$ is, of course, a function of the initial value $X_0$ of the parameter of each particular device SD tested.

Figure 8:
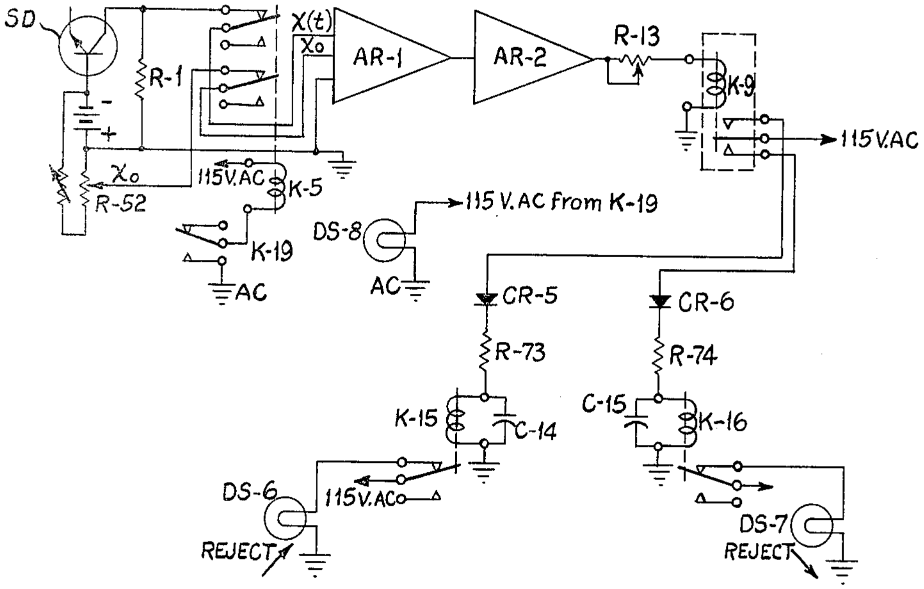
FIG. 8 is a circuit diagram of the drift reject circuit of the testing apparatus of FIGS. 1 and 2.

The apparatus of the present invention, after the $T_t$ computer operation, will then compare $X(t)$ (the voltage across R1 which is a function of $I_{CO}$ relative to time) with the initial value $X_0$ established at the end of the stabilization period. This latter potential, stored on potentiometer R52 by the nulling circuit (FIG. 3) is connected, as indicated in FIG. 8, to one input of the D.C. amplifier AR1 via contacts of relay K19. The $X(t)$ signal is similarly connected to the input of AR1. The output signal of the cascaded AR2 amplifier is fed to the coil of micropositioner K9. If the output voltage signal from AR2 exceeds the sensitivity (S) of the apparatus, the armature of micropositioner K9 will be moved upwardly or downwardly and thereby apply line voltage via a diode CR5 or CR6 to a relay coil K15 or K16, respectively, indicating a drift downwardly or upwardly in $I_{CO}$ in excess of present tolerance. Each of the coils of relays K15 and K16 is shunted by a capacitor C14 and C15, respectively, so as to provide some time delay in actuating the contacts of these relays in response to operation of K9. Thus a transient operation of K9 will not actuate the contacts of either K15 or K16. However, actuation of K9, other than transitorily (i.e., more than several seconds) will move one or the other of the armatures of K15 or K16 to a closed position to apply line voltage to DS6 or DS7, respectively, which thereby indicates "reject." If an updrift reject occurs (K16 energized) the circuit to elapsed time motor or timer B3 is deenergized. As this timer drives the helipot R54 to provide a voltage at its rotor which is an analog to the required lifetime, T, the value of this voltage at the rotor of R54 indicates the predicted lifetime of SD. This voltage may be read on meter M3 which is calibrated in thousands of hours.

If $X(t)$ does not exceed the equipment sensitivity, S, the apparatus for our invention will continue to test SD until the time $T_t$ elapses, assuming any noise generated by SD does not exceed tolerances which would be indicated by energization of reject light DS4. The accept circuit of FIG. 9, therefore, continues to operate until the time $T_t$ has elapsed. This circuitry functions to compare the previously computed voltage $T_t$ (or a fractional part of this voltage if the rotor of switch S14 is positioned on other than the "20K" contact) with a voltage proportional to elapsed time, $t$, from the beginning of the actual test. The voltage analog of this elapsed time $t$, as noted above, is present at the rotor of R54. The latter voltage is applied via a resistor R69 to one control grid of a dual triode vacuum tube V1. The former voltage $T_t$, or a fractional part thereof, is applied to the other control grid of V1, connected in a differential amplifier circuit. When the voltage developed at the R54 rotor just exceeds that applied to the other control grid, the coil of micropositioner K21 will be energized to apply line voltage to the coil of relay K14, thereby operating its contacts to energize dial light DS5 and indicate that the device SD is accepted. If it is desired the apparatus may be used to continue to test SD for a period longer than $t$ to predict lifetimes greater than $T_t$.

Provision is made for a continuous "read-out" or indication of $X(t)$ by means of a recorder 105 (FIG. 2A), such as sold under the trade designation "Rustrak," and/or by means of a pair of output terminals J7 and J8 (FIG. 2B) adapted to be connected to a recorder, such as sold under the trade designation "Varian."

The operation of the apparatus of this embodiment of the invention as described above, therefore, includes several phases or modes. The first mode, which follows the usual operation of switches, warm-up of the amplifiers, plugging in of the particular semiconductor device SD to be tested, setting of $X_{max}$ (R43), selection of T (S14), etc., is referred to as the stabilization period or mode. The length of this period is selected by an operator by his setting of timer M4. During this stabilization period DS2 is energized and the $X_t$ signal to the input of AR1 is continuously balanced or nulled (FIG. 3) against the potential preset at the rotor of R52 by the servo system including motor B1. This potential at R52 after completion of the stabilization period, and preferably manual nulling by knob 103, constitutes $X_0$ or a D.C. potential which is an analog of $I_{CO}$ at the initiation of actual testing. Another mode may be referred to as "$T_t$ computation," during which the value $T_t$, based on the apparatus sensitivity S, the required lifetime T, and the $X_{max}$ and $X_0$ values, is established (FIGS. 6 and 7). The last mode is the actual testing of SD to predict its satisfactory operational lifetime during which drift of the parameter $I_{CO}$ is continuously measured and, if it exceeds the pre-established limit, it will be rejected (FIG. 8) and, if it does not so exceed this established tolerance within the test period $T_t$, it will be accepted (FIG. 9). At the conclusion of stabilization and before actual testing begins, the $X_0$ signal is compared with the $X_{max}$ value (FIG. 4) and a reject solution will be indicated by energization of DS3 if $X_0$ exceeds $X_{max}$. During both the stabilization and testing modes, any noise generated by SD in excess of tolerance is determined (FIG. 5) and indicated at DS4.

It will be understood that parameters other than $I_{CO}$, such as input impedance ($h_{ob}$) of transistors, etc., may be used as the parametric criteria in accordance with the apparatus and methods of the present invention. Also, more than one such criterion may be utilized simultaneously or sequentially in testing semiconductor devices, and the relationship of such criteria to time may be linear, quadratic, exponential or logistic. In addition to testing a single semiconductor component, a multi-component semiconductor device, such as an amplifier or other system of components, may be tested to determine its predicted lifetime.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

We claim:

1. The method for predicting the reliable life of individual semiconductor devices, comprising the steps of measuring the initial value of at least one parameter of a semiconductor device, continuously measuring the value of said at least one electrical parameter of said device over a period of time, electrically comparing the value of said parameter during said period of time with a predetermined maximum value of said parameter and with said initial value of said parameter, measuring from the beginning of said time period the actual time elapsed when the value of said parameter exceeds said predetermined acceptable value, electrically measuring any electrical noise developed by said device during test, and rejecting said device upon said electrical measurement exceeding a predetermined level and indicating rejection of said device when the value of said measured parameter exceeds said predetermined maximum acceptable value within said time period, said actual time elapsed being a function of the reliable life of said device.

2. Apparatus for testing the reliable operating life of semiconductor devices comprising a source of electrical power connected in a first circuit with one of said devices to produce an electrical signal which is a function of a parameter of said device, a timer including an elapsed time indicator connected in a second circuit, said second circuit being connected to said first circuit in response to variation in the magnitude of said electrical signal, said second circuit including means for de-energizing the timer if the magnitude of said electrical signal exceeds a predetermined set of limits, and a third circuit for establishing a value of electrical signal analagous to the value of said parameter at the conclusion of a stabilization period and prior to the actual test period, said third circuit including a servo motor, a second timer and first potentiometer, said servo motor being connected in a feedback circuit with said first potentiometer and continuously responsive during operation of said second timer to a composite of said electrical signal during said stabilization period and the potential produced by said potentiometer, said servo motor being connected to drive the rotor of said first potentiometer to provide a first electrical potential analogous to the value of said parameter whereby at the conclusion of said stabilization period said first electrical potential is analogous to the stabilized value of said parameter.

3. A method as set forth in claim 1 which includes the further step of electrically comparing the time elapsed during the brief testing period with the computed value of the actual testing period, and indicating that the device is acceptable upon said elapsed time becoming equal to the computed value if said parameter does not exceed said predetermined acceptable value during said testing period.

4. Apparatus as set forth in claim 2 which includes a fourth circuit for comparing said stabilized value of said parameter with a preestablished maximum value thereof, said fourth circuit comprising a second potentiometer, and an indicator, said second potentiometer having a rotor to supply a second potential analogous to said preestablished maximum value, and means electrically connected in said fourth circuit responsive to said first potential exceeding said second potential to energize said indicator, whereby the indication indicates that the device under test is to be rejected.

5. Apparatus as set forth in claim 4 which includes a fifth circuit for computing the length of the test period corresponding to a preselected operating life of said device, said fifth circuit including said second potentiometer, and third and fourth potentiometers, and a second servo motor, said servo motor being responsive to a second electrical signal which is a composite of the first and second potentials and a third potential produced by said third potentiometer to drive the rotors of said third and fourth potentiometers, said fourth potentiometer being connected in a feedback circuit with an amplifier responsive to a third signal including the potential present at the rotor of said fourth potentiometer whereby a third electrical potential is provided which is an analog of the length of the test period corresponding to the preselected operating life of said device.

6. Apparatus as set forth in claim 5 which further includes a sixth circuit for continuously measuring any noise generated in the device being tested, said sixth circuit comprising amplifier means responsive to any A.C. components present in the first said electrical signal, and means responsive to the amplitude of said A.C. components whereby upon said amplitude exceeding a predetermined level said indicator is energized to indicate that the device under test is to be rejected.

7. Apparatus as set forth in claim 6, in which said semiconductor device is a transistor, and which further includes a resistor connected in series with said electrical power source and the base-collector elements of said transistor whereby the parameter of which the first said electrical signal is a function is the reverse bias collector to base leakage current.

8. Apparatus for predicting the reliable operating life of an individual semiconductor device comprising a source of electrical power connected in a first circuit with said device to produce an electrical signal which is a function of a parameter of said device, means for determining an initial stabilized value of said electrical signal, means for electrically comparing said initial value of said signal with a preestablished maximum permissible value of said electrical signal, means for indicating an increase in said electrical signal above said permissible value thereby indicating a rejection of said device, means for establishing an electrical potential which is an analog of the length of the test period for said device which will correspond to a preselected operating life of said device, electrical comparison and indicating means for electrically comparing said electrical potential with a second electrical potential which is an analog of the elapsed testing time and continuously indicating the predicted operating life of said device, and means responsive to an increase in the value of said electrical signal above a predetermined maximum acceptable value of said parameter to deactuate said electrical comparison and indicating means whereby the particular predicted operating life of the device being tested is indicated.

9. Apparatus as set forth in claim 8 which further includes means responsive to any A.C. components in said electrical signal, and second indicator means energized upon the value of said A.C. components exceeding a preselected level whereby the device being tested is rejected for excess noise.

10. Apparatus as set forth in claim 9, in which said semiconductor device is a transistor, and which further includes a resistor connected in series with said electrical power source and the base-collector elements of said transistor whereby the parameter of which the first said electrical signal is a function is the reverse bias collector to base leakage current.

References Cited by the Examiner

UNITED STATES PATENTS

| | | | |
|---|---|---|---|
| 2,743,418 | 4/1956 | Nichols et al. | 324—68 |
| 2,935,684 | 5/1960 | Lanning | 324—158 |
| 3,041,537 | 6/1962 | Cogle et al. | 324—158 |

OTHER REFERENCES

"Diode Drift Tester," F. C. Brammer and V. S. Zucco, I.B.M. Technical Disclosure Bulletin, vol. 2, No. 6, April 1960, page 66.

"Transistor Reliability Studies," R. M. Ryder and W. R. Sittner, Proceedings of the I.R.E., February 1954, pages 414–419.

WALTER L. CARLSON, *Primary Examiner.*

LLOYD McCOLLUM, *Examiner.*